Aug. 15, 1967         W. STEINIG                3,336,472
       DEVICE FOR THE SAFETY LIGHTING OF ROOMS OR
              OPEN-AIR INSTALLATIONS
Filed Aug. 20, 1965                           2 Sheets-Sheet 1

INVENTOR.
Walter Steinig
BY Ernest Montague
   attorney

United States Patent Office 3,336,472
Patented Aug. 15, 1967

3,336,472
DEVICE FOR THE SAFETY LIGHTING OF ROOMS OR OPEN-AIR INSTALLATIONS
Walter Steinig, Hemden uber Bocholt, Germany, assignor to Fa. Theo Benning, Bocholt, Westphalia, Germany, a corporation of Germany
Filed Aug. 20, 1965, Ser. No. 481,361
Claims priority, application Germany, May 22, 1965, B 82,074
7 Claims. (Cl. 240—37.1)

The present invention relates to a device for the safety lighting of rooms or open-air installations, which can be switched on or which switches on automatically when the mains supply fails.

In known safety lighting systems a distinction is made between stand-by lighting, which burns constantly alongside the normal lighting, and emergency lighting which is switched on only when the mains supply fails.

A distinction is also made between safety lighting installations using a central battery system and safety lighting installations using an individual battery system.

Installations arranged on a central battery system contain a central battery with the charging and switching means necessary for the purpose, which are so large that they are able to supply the entire safety lighting load for a building or other installation.

Such installations arranged on a central battery system require a separate network of lines for the safety lighting installation. It will be obvious, that if such an installation fails at a central point the risk of the entire safety lighting system failing is very great.

For this reason there have been numerous attempts to construct devices on an individual battery system, which are intended to obviate the disadvantages described hereinbefore. Even if individual devices in an installation fail, either owing to fire or owing to other influences, sufficient individual lamps remain capable of operation to prevent panic.

A plurality of safety lighting systems arranged on the individual battery principle are already known which are constructed in many different ways. But in most cases, the known safety lighting systems comprise a parallelepipedic box in which batteries and other means necessary for producing an emergency current are arranged. The light source, which in most cases is constructed as an incandescent lamp, is arranged either on the box itself or separately therefrom in a round, domed housing.

All the known safety lighting systems have the disadvantage that they have to be fitted separately from other existing lighting devices. More particularly in the case of rooms which are to give a good impression, such as in banks, department stores, schools, but also in control rooms and modern manufacturing shops, this fact constitutes an undesirable feature.

The known safety lighting systems have the further disadvantage, that they are relatively expensive to manufacture and to install, since special fittings are required. The latter disadvantage is particularly apparent when a safety lighting system has to be supplied in a moisture-proof or explosion-proof constructional form.

It is one object of the present invention to provide a device for the safety lighting of rooms of open-air installations which can be fitted without any special outlay in existing lighting apparatus or lighting apparatus which are to be constructed, and the external appearance of the lighting installation is not to be detrimentally affected by the safety lighting system. Also, it is intended to avoid expensive special manufacture for moisture-proofing and explosion-proofing.

It is another object of the present invention to provide a device for the safety lighting of rooms or open-air installations wherein the light source and the safety lighting components necessary for feeding the lightt source is arranged, in the event of current failure in an elongated housing whose dimensions and fixing elements are constructed in accordance with commercially conventional fluorescent lamps. The elongated housing is preferably to be constructed as a hollow cylinder of light-permeable material, such as e.g. Plexiglas or tempered glass, and closed at its ends by means of caps, at which contact pins are arranged for inserting the device in the commercially conventional mounts for fluorescent lamps. Conveniently, the housing is made non-transparent except for the emission surface in front of the light source, and this can be achieved for example by applying a coat of paint or by fitting non-transparent material.

It is still another object of the present invention to provide a device for the safety lighting of rooms or open-air installations wherein a reflector is arranged behind the light source which is situated preferably in the middle of the elongated housing, and the light source used is a fluorescent lamp of relatively small dimensions, which is fixed to a common support along with the components necessary for its operation, such as batteries, rectifiers, resistances, and relays. The support and the caps are so constructed that the support with the individual components can be removed from the housing in a simple manner.

It is yet another object of the present invention to provide a device for the safety lighting of rooms or open-air installations wherein, in order to provide a particularly advantageous construction for the device for safety lighting purposes, gas-tight nickel-cadmium batteries with sintered electrodes are used as the supply batteries. Also, a relay is arranged in the charging current circuit of the batteries and an excess voltage protection means is provided, which in the event of incorrect fitting of the device protects the individual components of the safety lighting device from destruction. In the charging part of the device there is also arranged a fuse, which is necessary for protecting the device, particularly when the device is fitted in places where there is a risk of explosion.

It is also a further object of the present invention to provide a device for the safety lighting of rooms or open-air installations wherein, in order to enable the safety lighting device to be used in damp or explosion-endangered spaces also, it is merely necessary to use commercially obtainable damp-environment fittings or explosion-proof fittings. In this way it is possible for the device to be used for these special purposes also, employing the known fittings for fluorescent lamps without any alterations.

It is still a further object of the present invention to provide a device for the safety lighting of rooms or open-air installations, which can be installed in a technically simple manner and which can be subsequently fitted in any existing fluorescent lamp mount in existing lighting strips simply by fitting the device in the main connections instead. For this purpose, the device according to the present invention is produced both to the dimensions of a 20 watt fluorescent lamp (590 mm. in length) and also with a length of 1200 mm. for a 40 watt fluorescent lamp. The differences in length existing between the two lamps of different output can be compensated for either by the insertion of lateral make-up elements or by fitting two of the devices according to the present invention one behind the other.

The safety lighting device according to the present invention is capable of being used either as a real emergency lighting device burning only when the mains fails or as a stand-by lighting device which burns constantly, i.e. along with the normal lighting and also when the mains fails. Its use is also not limited to the illumination of rooms, since it can readily be used in the open air also.

The safety lighting device according to the present invention is intended primarily for use in stationary lighting installations, but it may also be used as a freely movable stick lamp. For example, it is possible to use the device, arranged as an emergency lighting device, as a stick lamp when directing aircraft onto airfields, the lamp being connected to the mains again for charging after it has been used.

With these and other objects in view, which will become apparent in the following detailed description, the present invention will be clearly understood in connection with the accompanying drawings, in which.

Figure 1:
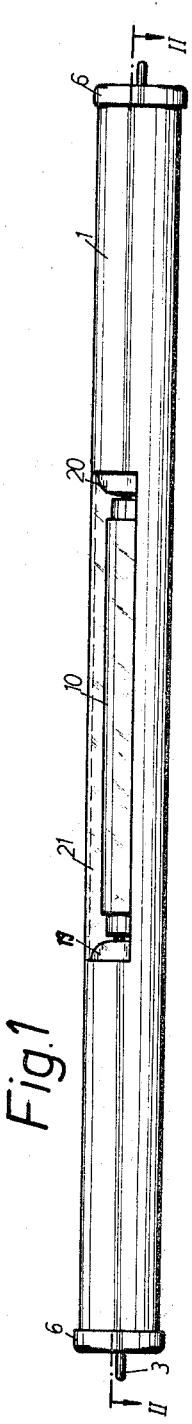
FIGURES 1 and 1a are front elevations and top plan view, respectively, of the safety lighting device designed in accordance with the present invention, in a state ready for fitting.
Figure 1A:
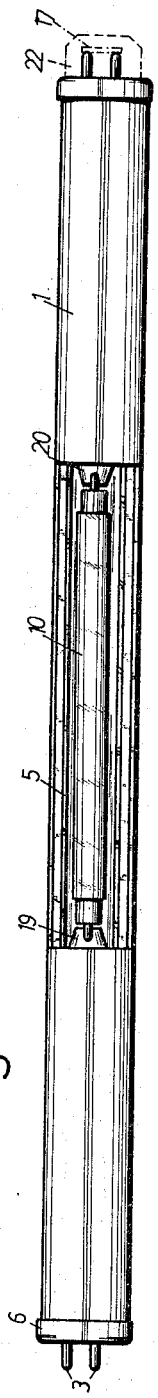
Figure 2:
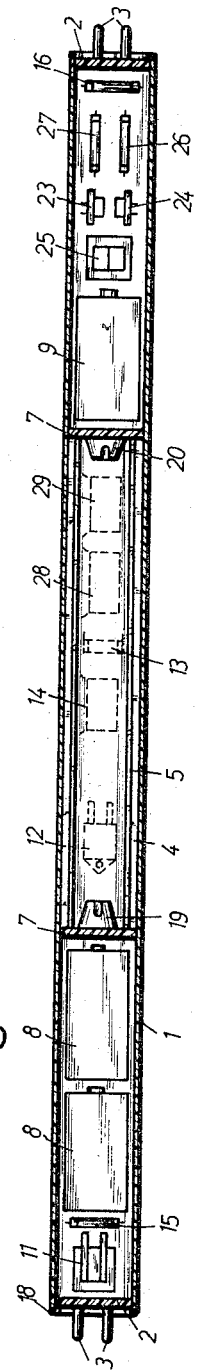
FIG. 2 is a plan view of the support removed from the housing, fitted with the components necessary for operating the device.

Referring now to the drawings, and in particular to FIGS. 1 and 2, the safety lighting device according to the present invention comprises a light source 10 disposed in an elongated housing 1, whose dimensions and fixing elements are constructed in accordance with commercially conventional fluorescent lamps. For this purpose the housing 1, made preferably of light-permeable material, such as e.g. Plexiglas, or tempered glass, is closed at its ends with caps 2 which carry contact pins 3 in the standard sizes used in fluorescent lamps for the insertion of the safety lighting device in commercially conventional fluorescent lamp mounts.

In the illustrated example of embodiment the light source 10 is constructed as a fluorescent lamp of relatively small dimensions whose mounts 19 and 20 are fixed at shielding walls 7 of a support 4. These walls 7 insure that the components required for operating the light source 10 in the event of a light failure cannot be seen from the outside through the transparent light emission surface 21 in front of the light source 10.

Figure 3:
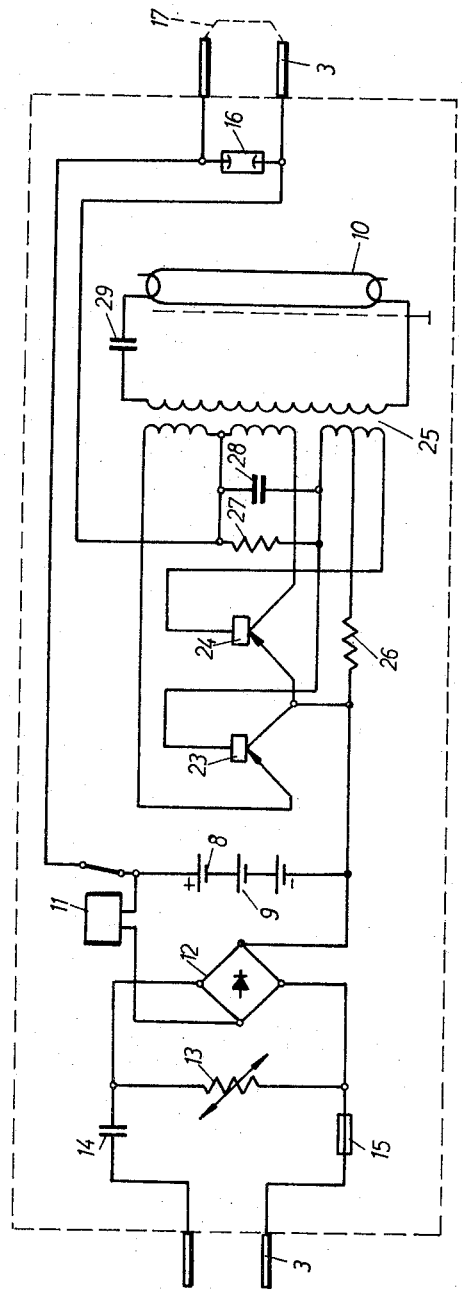
FIG. 3 is a circuit diagram of the device arranged for emergency lighting, in order to explain the method of operation in accordance with the present invention.

The components of the device according to the present invention, which for example according to FIG. 3 are arranged for emergency lighting, operating only when there is a mains failure, are fixed on the support 4 shown in FIG. 2. For the sake of presenting clear drawings, the necessary connecting leads which are disposed preferably at the underside of the support 4 in spaces provided for the purpose or which are incorporated in the support 4 at the production stage when the support 4 is being injection-molded or cast, have been omitted from the illustration shown in FIG. 2.

Referring now to the drawings, and in particular to FIG. 3, the contact pins 3 are connected at one side to the normal D.C. mains, whereas the contact pins 3 at the other side are short-circuited by a bridge 17. The latter is installed, in the case of a stationary fitting, in the mount, while it is mounted in the form of a contact plug 22, when the device is to be used as a transportable lamp.

By way of the contact pins 3 which are connected to the mains, batteries 8 and 9 are in constant communication with the mains with interposition of a condenser 14 for capacitive voltage division, a voltage-dependent resistance 13 for limiting any voltage peaks which may occur, and a rectifier 12 in a single-phase bridge connection. A fuse 15 is also provided in order to protect this charging part.

In the arrangement shown in FIG. 3, a relay 11 is connected in the charging current circuit of the batteries 8 and 9, so that it is always pulled in. When there is a mains failure, the relay 11 falls off and in the illustrated example of embodiment causes the light source 10 to be put into operation at once.

The components necessary for the operation of the light source 10 which, in the illustrated example of embodiment, is constructed as a fluorescent lamp, correspond to those of conventional transistor inverters for fluorescent lamps and are shown as transistors 23 and 24, a transformer 25, resistances 26 and 27, and condensers 28 and 29.

In order to prevent destruction of the safety lighting device, in the event of accidental confusion of the contact pins 3, which are to be connected to the mains, there is arranged between the contact pins 3 to be short-circuited an overvoltage protection device 16, which triggers the mains cutout in the event of an incorrect connection.

The choice of gas-tight nickel-cadmium batteries with sintered electrodes gives the device according to the present invention a very long working life, so that it can be operated for years without attention. The arrangement of individual components in the support 4, which is made of synthetic plastic material, enables the device to be arranged both horizontally and vertically. If the safety lighting system is not to be put into operation automatically immediately upon occurrence of a mains failure, but only when required, the bridge 17 can be taken by way of any desired switch or a contactor, which is closed when necessary. Furthermore, in order to check whether the device is capable of operating, with the bridge closed, the mains can be taken for example via a key with a breaker. When in this case the device is separated from the mains by pressing the key, the light source of the safety lighting device will be lit up.

In order to increase the light yield of the source 10, it is convenient to arrange a reflector 5 on the support 4. Between the housing 1 and the caps 2, there are also provided sealing elements 18 which enable the device according to the present invention to be used in damp or explosion-endangered places. It is convenient to use cover rings 6, in order to obtain a better seal between the caps 2 and the housing 1.

While I have disclosed one embodiment of the present invention with certain useful variants thereof, it is to be understood that this embodiment is given by example only and not in a limiting sense, the scope of the present invention being determined by the objects and the claims.

I claim:

1. A device for the safety lighting of rooms or open-air installations which can be switched on or switches on automatically in the event of a mains failure, comprising
    a light fixture having sockets at oppositely disposed ends spaced apart from each other and adapted to receive a conventional fluorescent bulb of any length in said sockets and fitting said light fixture,
    an elongated housing of light permeable material,
    cap means having contact pins secured to the opposite ends of said elongated housing, said contact pins being received in said sockets and operatively connected with D.C. mains,
    a fluorescent bulb shorter than and received in said elongated housing,
    mounts disposed in said elongated housing spaced apart from each other at a distance equal to the length of and receiving said fluorescent bulb,
    electrical circuit means disposed in said elongated housing and including means for rendering operative said fluorescent bulb in response to a failure of said D.C. mains.

2. The device, as set forth in claim 1, which includes an over-voltage protection means disposed in parallel with said contact pins, and
    said over-voltage protection means triggering a cutout of said D.C. mains in case of an overcharge.

3. The device, as set forth in claim 1, wherein
    said fluorescent bulb is disposed, in the center of said elongated housing, and includes a reflector arranged in said housing behind said fluorescent bulb.

4. The device, as set forth in claim 1, which includes
a support disposed in said elongated housing,
component means including said circuit means secured to said support,
said component means comprising at least one battery and a rectifier in series with said battery mounted in said elongated housing,
a relay disposed between said battery and said rectifier, and
leads connecting electrically said fluoroscent bulb with said battery.

5. The device, as set forth in claim 4, wherein
said support jointly with said component means constitutes a single unit removably disposed in said elongated housing.

6. The device, as set forth in claim 1, which includes a fuse disposed in series with one of said contact pins.

7. The device, as set forth in claim 1, which includes sealing elements disposed between said housing and said caps, thereby permitting the use of the device in damp or explosion-endangered places.

References Cited
UNITED STATES PATENTS

| | | | |
|---|---|---|---|
| 2,389,762 | 11/1945 | Burke | 240—37.1 X |
| 2,760,053 | 8/1956 | Choisser | 240—11.4 |
| 3,108,908 | 10/1963 | Krebs | 136—24 X |
| 3,222,513 | 12/1965 | De Feo | 240—37.1 |
| 3,233,091 | 2/1966 | Hunt | 240—37.1 X |
| 3,249,749 | 5/1966 | Haas | 240—11.4 |

NORTON ANSHER, *Primary Examiner.*

D. L. JACOBSON, *Examiner.*